United States Patent
Yu

(10) Patent No.: US 8,077,631 B2
(45) Date of Patent: Dec. 13, 2011

(54) METHOD AND TERMINAL FOR TRANSMITTING UPLINK DATA

(75) Inventor: Yang Yu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 98 days.

(21) Appl. No.: 12/529,039

(22) PCT Filed: Sep. 6, 2007

(86) PCT No.: PCT/CN2007/002662
§ 371 (c)(1),
(2), (4) Date: Aug. 28, 2009

(87) PCT Pub. No.: WO2008/122169
PCT Pub. Date: Oct. 16, 2008

(65) Prior Publication Data
US 2010/0014438 A1    Jan. 21, 2010

(30) Foreign Application Priority Data
Apr. 6, 2007   (CN) .......................... 2007 1 0090423

(51) Int. Cl.
*H04J 1/16* (2006.01)
(52) U.S. Cl. ........................................ 370/252; 370/278
(58) Field of Classification Search ................... 370/241, 370/252, 276, 282, 464, 480, 485, 486, 487, 370/489, 490, 493; 725/105, 109, 110, 111, 725/118, 121
See application file for complete search history.

(56) References Cited

U.S. PATENT DOCUMENTS

| | | | |
|---|---|---|---|
| 6,650,697 B1 * | 11/2003 | Tate et al. ...................... | 375/222 |
| 7,089,580 B1 * | 8/2006 | Vogel et al. ................... | 725/111 |
| 2005/0289632 A1 * | 12/2005 | Brooks et al. ................. | 725/126 |

FOREIGN PATENT DOCUMENTS

| | | |
|---|---|---|
| CN | 1086945 A | 5/1994 |
| CN | 1109700 A | 10/1995 |
| CN | 1422472 A | 6/2003 |
| WO | 94/06218 | 3/1994 |
| WO | 2006/130272 A2 | 12/2006 |

OTHER PUBLICATIONS

International Search Report: PCT/CN2007/002662.

* cited by examiner

*Primary Examiner* — Kwang B Yao
*Assistant Examiner* — Obaidul Huq
(74) *Attorney, Agent, or Firm* — Ladas & Parry LLP

(57) ABSTRACT

Embodiments of the present invention disclose a method for transmitting uplink Ethernet data in a coaxial network, a Coaxial Network Unit (CNU) and a Coaxial Line Terminal (CLT) applying the method. In the method, the CNU determines a transmission path loss between the CNU and the CLT, determines a transmission level for transmitting uplink data according to the transmission path loss, and transmits the uplink data by using the determined transmission level. The present invention ensures the security of data uplink transmission in an Ethernet Passive Coaxial Network (EPCN) system in essence and dramatically increases service quality.

14 Claims, 4 Drawing Sheets

METHOD AND TERMINAL FOR TRANSMITTING UPLINK DATA

FIELD OF THE INVENTION

The present invention relates to Ethernet communication techniques, and more particularly, to a method and terminal for transmitting uplink Ethernet data in a coaxial network.

BACKGROUND OF THE INVENTION

With the continuous development of Ethernet techniques, an Ethernet Passive Coaxial Network (EPCN) system currently emerges. The EPCN system employs the Ethernet as transmission medium. FIG. 1 is a schematic diagram illustrating a structure of an EPCN system. As shown in FIG. 1, the EPCN system mainly includes a Coaxial-Cable Line Terminal (CLT), a branch/distributor (hereinafter called as branch) and a Coaxial-Cable Network Unit (CNU). In the EPCN system, a structure of point-to-multipoint is adopted, i.e., one CLT communicates with a plurality of CNUs through a passive coaxial cable. In the uplink direction, data streams are transmitted in form of burst Ethernet frames. The EPCN system is applicable for various service environments. For example, the most popular environment is an application in corridor for users of Ethernet broadband.

In the EPCN system, a basic data transmission procedure includes: in the downlink direction, the CLT transmits data to the branch, and the data are transmitted to the CNUs of different users through the branch. In the uplink direction, each CNU transmits data of itself to the branch, and the data are transmitted to the CLT through the branch.

It can be seen from the above data transmission procedure in the EPCN system that, in the uplink direction, the data of any CNU must pass the branch before arriving at the CLT. Therefore, in order to avoid that the data sent by one CNU destined at the CLT passes the branch and then arrives at another CNU, the branch has a fixed level isolating amplitude. The level isolating amplitude is higher than a transmission path loss between the CLT and the branch when data is transmitted. For example, the level isolating amplitude usually is 25 dBv. Thus, only if a transmission level adopted by the CNU when transmitting uplink data is higher than the sum of a receiving level of the CLT and the transmission path loss between the CLT and the branch but is lower than the level isolating amplitude of the branch, the branch is able to isolate the data, i.e., transmit the data only to the CLT but not to the CNU of another user.

However, in practical service implementations, the transmission levels adopted by all the CNUs are generally uniform, and the uniform transmission level is determined according to a maximum transmission level required by the CNUs. The maximum transmission level is generally higher than the level isolating amplitude of the branch. Thus, the branch can not isolate the data transmitted by the CNUs, which results in that the data transmitted by the CNU of one user is filched by the CNU of another user.

For example, take the scenario that the EPCN system is applied in corridor for users of Ethernet broadband as an example. Each CNU is equipped respectively in home of each user. The transmission path loss from the CLT to a TV signal access point of each home is basically the same. But since the CNUs in different homes have different locations, each home may have a different indoor transmission path loss. For example, the transmission path loss from the CLT to each access point is 22 dBv. A CNU1 of a user 1 is equipped at the access point, e.g. living room. Thus, the transmission path loss between the CNU1 of the user 1 and the CLT is 22 dBv.

For a user 2, a CNU2 is equipped behind a 3-distributor the loss of which is generally 6 dBv, e.g. the CNU2 is equipped at a bedroom. Thus, the total transmission path loss between the CNU2 of the user 2 and the CLT is 22 dBv+6 dBv=28 dBv. In other words, the transmission path loss between the CNU1 and the CLT and that between the CNU2 and the CLT are different. Suppose the minimum receiving level of the CLT is 1 dBv. Since all CNUs will transmit data signals according to the maximum transmission path loss, both the CNU1 and the CNU2 will transmit the uplink data using a transmission level of 28 dBv+1 dBv. As to the CNU2 of the user 2, the transmission level of 28 dBv+1 dBv will become 22 dBv+1 dBv when the data signal arrives at the access point due to the loss of the 3-distributor in the user 2's home. The level isolating amplitude of the branch in corridor is 25 dBv. Thus, the branch is able to isolate the uplink data transmitted by the CNU2. Therefore, the uplink data transmitted by the CNU2 will not be filched by the CNU in other user's home. However, if the CNU1 also transmits uplink data by using the transmission level of 28 dBv+1 dBv, since there is no loss of 3-distributor in the user 1's home, the signal energy of 28 dBv+1 dBv will directly adds to the branch in corridor. Since the level isolating amplitude of the branch is 25 dBv, the branch cannot isolate the uplink data transmitted by the CNU1 of the user 1. Thus, the uplink data transmitted by the CNU1 may be filched by the CNU in other user's home.

It can be seen from the above that, in the prior art, the branch connected with different users cannot ensure the isolation of the uplink data transmitted by the CNUs in essence. Thus, the data transmitted by the CNU of one user may be filched by the CNU of another user, thereby dramatically decreasing the security of the data uplink transmission and decreasing service quality.

SUMMARY OF THE INVENTION

Embodiments of the present invention provide a method for transmitting uplink data, a CNU and a CLT, so as to increase security of data uplink transmission in an EPCN system.

According to an embodiment of the present invention, a method for implementing uplink transmission of Ethernet data in a coaxial network is provided. The method for transmitting uplink data in a coaxial network which comprise a Coaxial Line Terminal (CLT), a plurality of a Coaxial Network Unit (CNU) and a branch for connecting the CLT and the CNU includes: determining, by the CNU, a transmission path loss in a CLT-CNU direction according to a receiving level of the CNU and a downlink transmission level adopted by the CLT; determining, by the CNU, a transmission level for transmitting uplink data according to the transmission path loss; and transmitting, by the CNU, the uplink data by using the transmission level. The transmission level for transmitting uplink data is higher than the transmission path loss in CLT-CNU direction but lower than level isolating amplitude of the branch.

According to another embodiment of the present invention, a CNU applying the method is provided. The terminal includes: a path loss determining unit, adapted to determine a transmission path loss between the CNU and a CLT, and send the transmission path loss; a transmission level determining unit, adapted to determine a transmission level for transmitting uplink data according to the transmission path loss, and send the determined transmission level; and a transmitting/receiving unit is adapted to transmit the uplink data by using the transmission level.

The corresponding CLT includes: a downlink data processing unit, adapted to carry a transmission level for transmitting downlink data in the downlink data, and send the downlink data and a transmitting/receiving unit, adapted to transmit the downlink data received from the downlink data processing unit to a CNU.

It can be seen from the above that, in the embodiments of the present invention, the CNU determines the transmission level for transmitting the uplink data according to the transmission path loss. Thus, when the uplink data is transmitted by using this transmission level, each CNU can dynamically adjust its transmission level according to the transmission path loss between itself and the CLT. Therefore, the CNUs no longer transmit the uplink data by using the uniform transmission level, which ensures that the branch in corridor is able to isolate the uplink data transmitted by the CNUs and avoid that the uplink data transmitted by the CNU of one user is filched by the CNU of another user. Hence, the security of the data uplink transmission in the EPCN system is dramatically increased and the service quality is also increased.

DETAILED DESCRIPTION OF THE INVENTION

The present invention will be described in detail hereinafter with reference to accompanying drawings and embodiments to make the technical solution and merits therein clearer.

Embodiments of the present invention provide a method for transmitting uplink data in an EPCN system. The main idea relies in that: a CNU determines a transmission path loss between a CLT and the CNU, determines a transmission level for transmitting uplink data according to the transmission path loss, then transmits the uplink data by using the determined transmission level.

Figure 1:
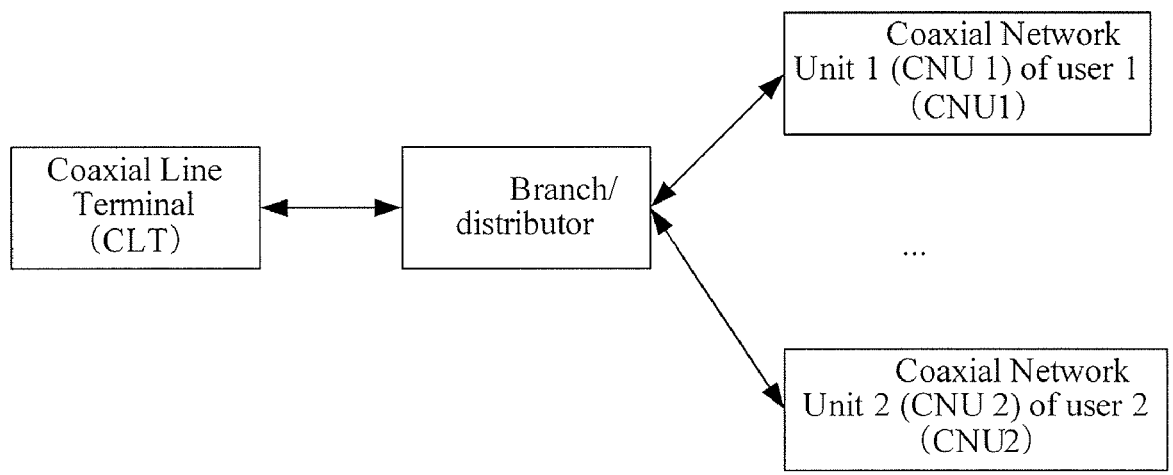
FIG. 1 is a schematic diagram illustrating a structure of a conventional EPCN system.
Figure 2:
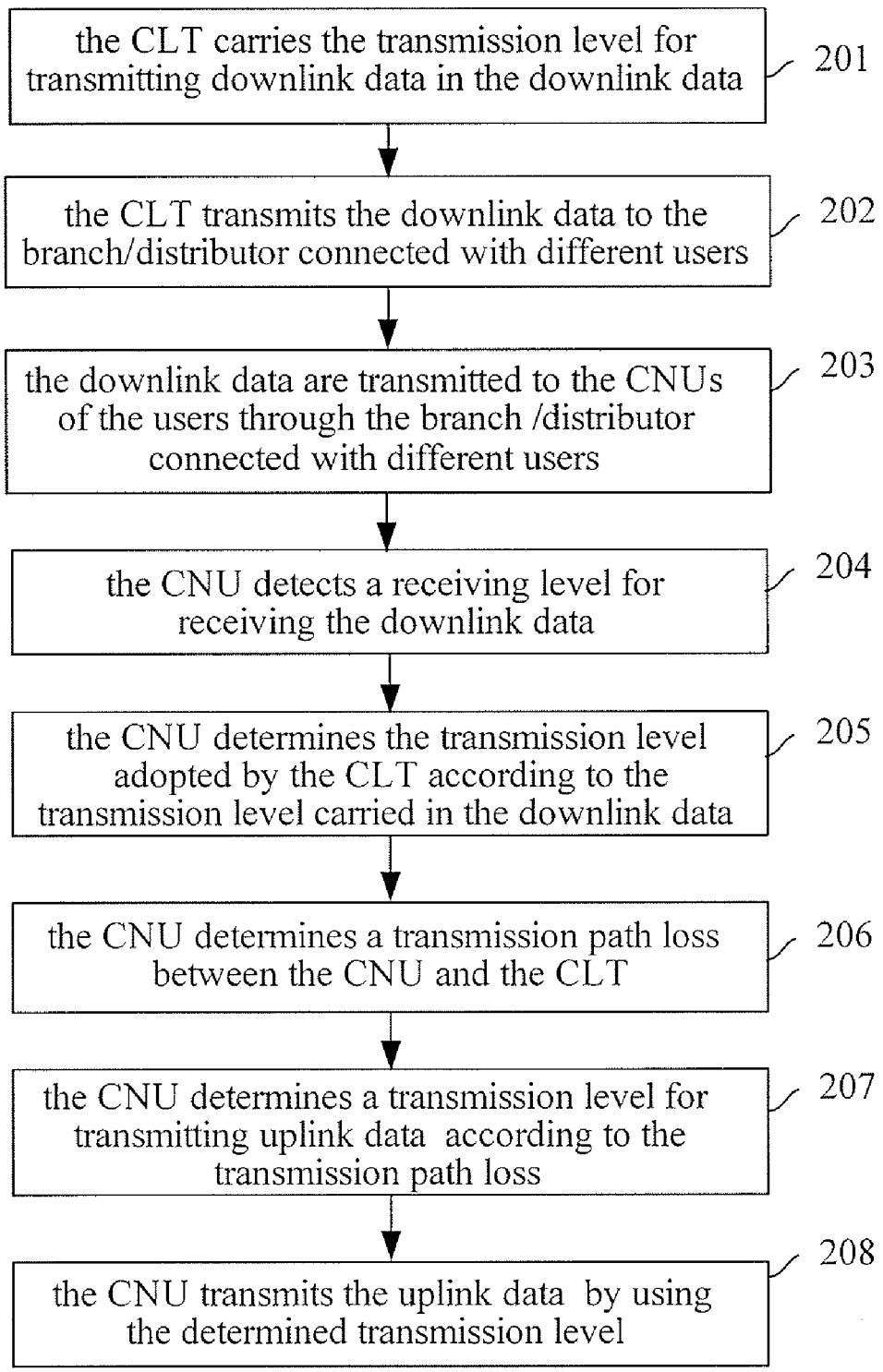
FIG. 2 is a flowchart illustrating a method for transmitting uplink data in an EPCN system according to an embodiment of the present invention.

FIG. 2 is a flowchart illustrating a method for transmitting uplink data in an EPCN system according to an embodiment of the present invention. As shown in FIG. 2, in the embodiment of the present invention, the method for transmitting the uplink data in the EPCN system includes the following processes.

Block 201: when transmitting downlink data, a CLT carries a transmission level adopted for transmitting the downlink data in the downlink data.

At this block, the procedure of the CLT carrying the transmission level adopted for transmitting the downlink data in the downlink data may be as follows.

The CLT adds a field in the downlink data in advance; when transmitting the downlink data, the CLT carries the transmission level adopted for transmitting the downlink data in the field added in advance in the downlink data.

Or when transmitting the downlink data, the CLT may carry the transmission level adopted for transmitting the downlink data in an existing field, e.g., a padding field, in the downlink data.

Block 202: the CLT transmits the downlink data to a branch.

Block 203: the downlink data are transmitted to CNUs of different users through the branch.

Block 204: the CNU detects a receiving level adopted for receiving the downlink data.

At this block, the CNU may detect the receiving level adopted for receiving the downlink data by using an adaptive receiving technique. The detailed process belongs to the prior art and will not be described herein.

Block 205: after receiving the downlink data, the CNU determines the transmission level adopted by the CLT according to the transmission level carried in the downlink data.

Through the blocks 201 to 204, the CNU determines the transmission level adopted by the CLT. In practical service implementations, the CNU may determine the transmission level adopted by the CLT through other methods. For example, it is possible to pre-configure on the CNU the transmission level adopted by the CLT, and the CNU determines the transmission level adopted by the CLT according to the configuration.

Block 206: the CNU subtracts the detected receiving level from the transmission level adopted by the CLT, and determines the difference as a transmission path loss between the CNU and the CLT.

At this block, for example, it is determined that the transmission level adopted by the CLT is 30 dBv and the receiving level of the CNU is 8 dBv. 30 dBv minus 8 dBv is 22 dBv. Thus it is determined that the transmission path loss between the CNU and the CLT is 22 dBv.

Through the above blocks 201 to 206, the CNU is able to determine the transmission path loss between the CNU and the CLT.

Block 207: the CNU determines a transmission level for transmitting uplink data according to the determined transmission path loss.

In practical service implementations, it is only required that when arriving at the branch, the level of the uplink data transmitted by the CNU is not higher than the level isolating amplitude of the branch. Thus, the branch can physically isolate the uplink data among the CNUs, thereby ensuring the security of the uplink data.

It can be known from the conventional data transmission procedure that the level isolating amplitude of the branch is higher than the transmission path loss between the CLT and the branch. Thus, if there is no additional path loss between the CNU and the branch, the transmission path loss between the CLT and the CNU determined by the CNU is equal to the transmission path loss between the CLT and the branch. If the uplink data is transmitted by using this transmission path loss, it can be ensured that the level of the uplink data is not higher than the level isolating amplitude of the branch when arriving at the branch. For example, when the CNU1 mentioned above in the background is equipped at the doorway of the user 1's home, i.e. there is no additional loss between the CNU1 and the branch, the CNU1 may determine that the transmission path loss is 22 dBv which is lower than the level isolating amplitude 25 dBv of the branch. Thus, if the CUN1 transmits the uplink data by adopting a transmission level higher than 22 dBv but lower than 25 dBv e.g. the minimum receiving level of the CLT is 1 dBv and the transmission level of the CNU1 is 23 dBv, it can be ensured that the uplink data can arrive at the CLT but not arrive at other user terminals connected with the branch in the corridor. Thus, isolation of the uplink data is realized.

If there is additional path loss between the CNU and the branch in the corridor, when the CNU transmits the uplink data by adopting a transmission level which equals to the transmission path loss between the CLT and the CNU determined by the CNU according to the method provided by the embodiments of the present invention, after passing the branch in the corridor, the transmission level is still able to ensure that the uplink data can arrive at the CLT but not arrive at other user terminals connected with the branch. Thus, the isolation of the uplink data is also ensured. For example, as to the CNU2 which is equipped behind the 3-distributor in the user 2's home mentioned above in the background, there is the additional loss between the CNU2 and the branch. The transmission path loss determined by the CNU2 according to the method of the present invention is 28 dBv. When the CNU2 transmits the uplink data by adopting a transmission level higher than 28 dBv but lower than 31 dBv, for example, the transmission level adopted by the CNU2 is 29 dBv and the minimum receiving level of the CLT is 1 dBv, although the transmission level is higher than the level isolating amplitude of the branch, i.e. 25 dBv, it will become lower than 25 dBv but higher than 22 dBv, i.e. 23 dBv after the uplink data undergoes 6 dBv attenuation of the 3-distributor in the user 2's home. Thus, it is also ensured that the uplink data can arrive at the CLT but not received by other user terminals connected with the branch in the corridor.

It can be seen from the above that, at this block, the CNU may directly take the transmission path loss between the CNU and the CLT as the transmission level for transmitting the uplink data.

In addition, since there may be burst interferences in the network, on basis of implementing the uplink data isolation, in order to further ensure the uplink data transmitted by the CNU can arrive at the CLT, it is required that the transmission level of the uplink data is slightly higher than the sum of the receiving level of the CLT and the transmission path loss determined by the CNU. Therefore, at this block, the CNU may preferably add the receiving level of the CLT and an adjusting level to the transmission path loss, and determines the sum as the transmission level for transmitting the uplink data. The adjusting level meets a following condition: the difference between the transmission level calculated by using the adjusting level and the transmission path loss between the CNU and the branch is not higher than the level isolating amplitude of the branch.

Block 208: the CNU transmits the uplink data by adopting the determined transmission level.

Figure 3:
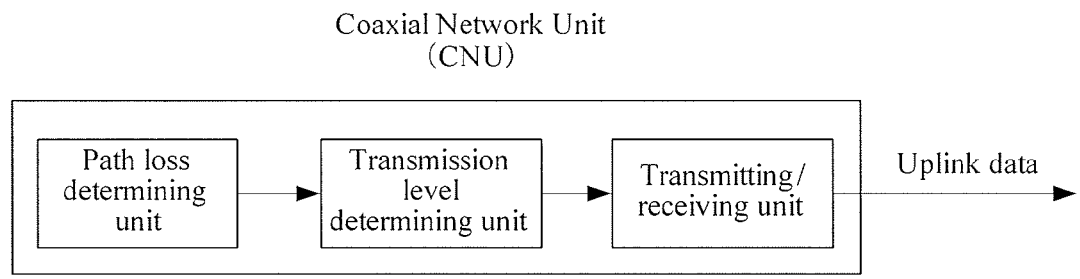
FIG. 3 is a schematic diagram illustrating a structure of a CNU according to an embodiment of the present invention.

Accordingly, the embodiments of the present invention also provide a CNU. FIG. 3 is a schematic diagram illustrating a structure of the CNU according to an embodiment of the present invention. As shown in FIG. 3, in the present invention, the CNU may include a path loss determining unit, a transmission level determining unit and a transmitting/receiving unit.

The path loss determining unit is adapted to determine a transmission path loss between the CNU and a CLT and send the transmission path loss to the transmission level determining unit.

The transmission level determining unit is adapted to determine a transmission level for transmitting uplink data according to the received transmission path loss and pre-determined receiving level of the CLT, and send the determined transmission level to the transmitting/receiving unit.

The transmitting/receiving unit is adapted to transmit the uplink data by adopting the transmission level.

The path loss determining unit may determine the transmission path loss between the CNU and the CLT as follows.

The transmitting/receiving unit sends downlink data carrying a transmission level of the downlink data from the CLT to the path loss determining unit. The path loss determining unit determines the transmission level adopted by the CLT according to the transmission level carried in the downlink data, detects a receiving level for receiving the downlink data, subtracts detected receiving level from the transmission level adopted by the CLT, and takes the difference as the transmission path loss between the CUN and the CLT.

Figure 4:
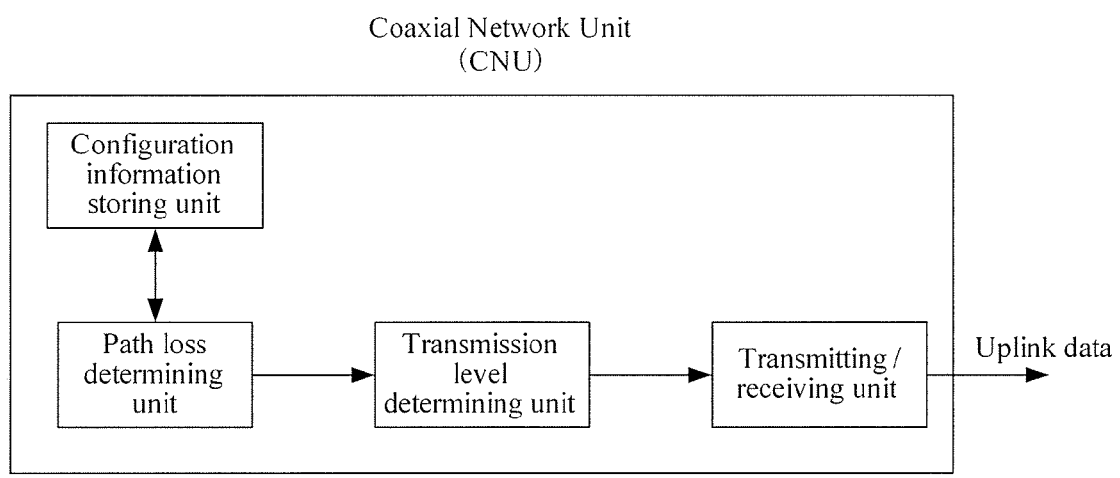
FIG. 4 is a schematic diagram illustrating a structure of a CNU according to a preferred embodiment of the present invention.

FIG. 4 is a schematic diagram illustrating a preferable structure of a CNU according to an embodiment of the present invention. In this embodiment, the CNU may further include a configuration information storing unit, adapted to store the pre-configured transmission level of the CLT. In this embodiment, the path loss determining unit may determine the transmission path loss between the CNU and the CLT as follows: the path loss determining unit determines the transmission level adopted by the CLT according to the information stored in the configuration information storing unit, detects the receiving level for receiving the downlink data, subtracts the detected receiving level from the transmission level adopted by the CLT, and takes the difference as the transmission path loss between the CNU and the CLT.

Figure 5:
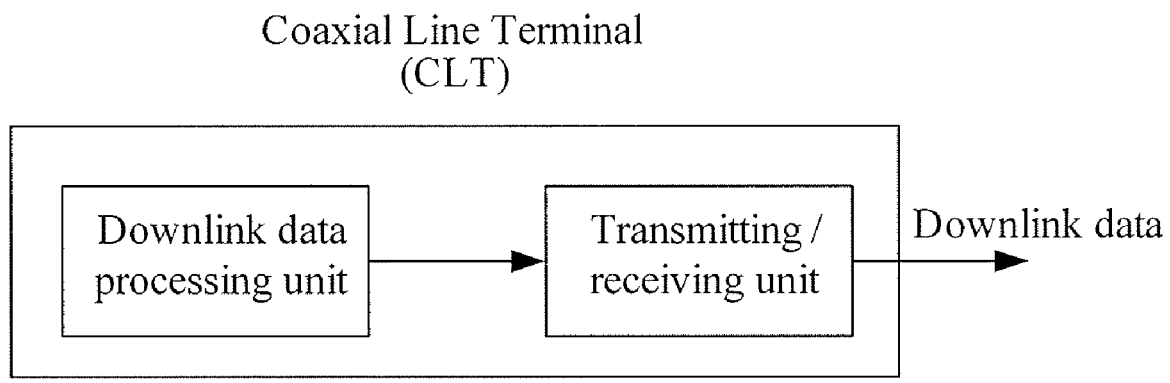
FIG. 5 is a schematic diagram illustrating a structure of a CLT according to an embodiment of the present invention.

Accordingly, the embodiments of the present invention also provide a CLT. FIG. 5 is a schematic diagram illustrating a structure of a CLT according to an embodiment of the present invention. As shown in FIG. 5, the CLT includes a downlink data processing unit and a transmitting/receiving unit.

The downlink data processing unit is adapted to carry a transmission level for transmitting downlink data in the downlink data, and send the downlink data to the transmitting/receiving unit.

The transmitting/receiving unit is adapted to transmit the downlink data received from the downlink data processing unit to the CNU.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A method for transmitting uplink data in a coaxial network which comprise a Coaxial Line Terminal (CLT), a plurality of a Coaxial Network Unit (CNU) and a branch for connecting the CLT and the CNU, comprising:
   determining, by the CNU, a transmission path loss in a CLT-CNU direction according to a receiving level of the CNU and a downlink transmission level adopted by the CLT;
   determining, by the CNU, a transmission level for transmitting uplink data according to the transmission path loss; and
   transmitting, by the CNU, the uplink data to the CLT through the branch by using the transmission level; wherein the transmission level for transmitting uplink data is higher than the transmission path loss in CLT-CNU direction but lower than level isolating amplitude of the branch to make the branch transmit the uplink data only to the CLT and not to another CNU, wherein the determining the transmission level for transmitting the uplink data according to the transmission path loss comprises:

determining the transmission level for transmitting the uplink data according to a sum of the transmission path loss, a receiving level of the CLT and an adjusting level, the adjusting level meeting a following condition: a difference between the transmission level for transmitting the uplink data determined according to the adjusting level and a path loss between the CNU and the branch is not higher than the level isolating amplitude of the branch.

2. The method of claim 1, wherein the determining the transmission path loss in the CLT-CNU direction according to the receiving level of the CNU and the downlink transmission level adopted by the CLT comprises:

subtracting, by the CNU, the receiving level of the CNU from the downlink transmission level adopted by the CLT, and determining a difference obtained as the transmission path loss in the CLT-CNU direction.

3. The method of claim 2, wherein the downlink transmission level adopted by the CLT is carried in downlink data received by the CNU.

4. The method of claim 3, wherein the transmission level adopted by the CLT for transmitting the downlink data is carried in a pre-added field or an existing field in the downlink data.

5. A computer apparatus, comprising a set of instructions and cooperative hardware for implementing the method as described in claim 4.

6. A computer apparatus, comprising a set of instructions and cooperative hardware for implementing the method as described in claim 3.

7. A computer apparatus, comprising a set of instructions and cooperative hardware for implementing the method as described in claim 2.

8. The method of claim 1, wherein the downlink transmission level adopted by the CLT is pre-configuring on the CNU.

9. A computer apparatus, comprising a set of instructions and cooperative hardware for implementing the method as described in claim 8.

10. A computer apparatus, comprising a set of instructions and cooperative hardware for implementing the method as described in claim 1.

11. A computer apparatus, comprising a set of instructions and cooperative hardware for implementing the method as described in claim 1.

12. A Coaxial Network Unit (CNU), comprising:

a path loss determining unit, adapted to determine a transmission path loss in a CLT-Coaxial Network Unit (CNU) direction according to a receiving level of the CNU and a downlink transmission level adopted by the CLT, and send the transmission path loss to a transmission level determining unit;

the transmission level determining unit, adapted to determine a transmission level for transmitting uplink data according to the transmission path loss, and send the determined transmission level to a transmitting/receiving unit; and the transmitting/receiving unit, adapted to transmit the uplink data to the CLT through a branch by using the transmission level; wherein the transmission level for transmitting uplink data is higher than the transmission path loss in CLT-CNU direction but lower than level isolating amplitude of the branch to make the branch transmit the uplink data only to the CLT and not to another CNU, wherein the transmission level is determined according to a sum of the transmission path loss, a receiving level of the CLT and an adjusting level, the adjusting level meeting a following condition: a difference between the transmission level for transmitting the uplink data determined according to the adjusting level and a path loss between the CNU and a branch connecting the CLT and the CNU is not higher than a level isolating amplitude of the branch.

13. The CNU of claim 12, wherein the transmitting/receiving unit is further adapted to send downlink data carrying the downlink transmission level adopted by the CLT received from the CLT to the path loss determining unit; and the path loss determining unit is further adapted to determine the downlink transmission level adopted by the CLT according to the transmission level carried in the downlink data, detect a receiving level for receiving the downlink data, subtract the receiving level from the downlink transmission level adopted by the CLT, and determine a difference obtained as the transmission path loss in the CLT-CNU direction.

14. The CNU of claim 12, further comprising:

a configuration information storing unit, adapted to store a pre-configured downlink transmission level adopted by the CLT; and the path loss determining unit is further adapted to detect a receiving level for receiving the downlink data, subtract the receiving level from the downlink transmission level adopted by the CLT, and determine a difference obtained as the transmission path loss in the CLT-CNU direction.

\* \* \* \* \*